United States Patent
Abeles (10) Patent No.: US 12,350,533 B1
(45) Date of Patent: Jul. 8, 2025

(54) BIODEGRADABLE SAP-CONTAINING PELLETS APPLICABLE TO VEGETATION FOR FIRE PROTECTION AND SUPPRESSION

(71) Applicant: VIRIDIS ARBOR LLC, Verona, NJ (US)

(72) Inventor: Gary E. Abeles, Verona, NJ (US)

(73) Assignee: VIRIDIS ARBOR LLC, Verona, NJ (US)

( * ) Notice: Subject to any disclaimer, the term of this patent is extended or adjusted under 35 U.S.C. 154(b) by 0 days.

(21) Appl. No.: 19/048,030

(22) Filed: Feb. 7, 2025

Related U.S. Application Data (60) Provisional application No. 63/719,901, filed on Nov. 13, 2024.

(51) Int. Cl.
| | | |
|---|---|---|
| *A62D 1/00* | (2006.01) | |
| *A62C 3/02* | (2006.01) | |
| *A62C 3/16* | (2006.01) | |
| *C09K 21/14* | (2006.01) | |

(52) U.S. Cl.
CPC .............. *A62D 1/0014* (2013.01); *A62C 3/02* (2013.01); *A62C 3/16* (2013.01); *A62D 1/0021* (2013.01); *A62D 1/0064* (2013.01); *C09K 21/14* (2013.01)

(58) Field of Classification Search
None
See application file for complete search history.

(56) References Cited

U.S. PATENT DOCUMENTS

| | | | | |
|---|---|---|---|---|
| 6,500,947 | B1 * | 12/2002 | West | A61L 15/60 |
| | | | | 536/56 |
| 7,396,584 | B2 * | 7/2008 | Azad | C08J 3/243 |
| | | | | 428/407 |
| 8,440,009 | B2 * | 5/2013 | Mahan | C12N 1/12 |
| | | | | 428/920 |
| 2003/0044562 | A1 * | 3/2003 | Li | A61F 13/53 |
| | | | | 428/59 |
| 2003/0149413 | A1 * | 8/2003 | Mehawej | A61F 13/531 |
| | | | | 604/378 |
| 2005/0004542 | A1 * | 1/2005 | Bakkila | A47G 23/032 |
| | | | | 604/367 |
| 2012/0157904 | A1 * | 6/2012 | Stein | D04H 1/49 |
| | | | | 427/430.1 |

(Continued)

*Primary Examiner* — Joseph D Anthony
(74) *Attorney, Agent, or Firm* — Maine Cernota & Curran (57) ABSTRACT

A fire-retardant material comprises a plurality of particles, each having an SAP core surrounded by a fibrous layer to which an outer attachment layer is anchored. When applied to vegetation from an aircraft or ground vehicle, the attachment layer maintains the particle in contact with the vegetation. Concurrent or subsequent application of water hydrates the SAP, which is held proximate the vegetation and retards the fire. The SAP, fibrous layer, and/or attachment layer can be biodegradable. The fibrous layer can comprise coir. The attachment layer can comprise one or more naturally occurring plant materials, such as seed pods having an adhesive attachment feature and/or mechanical attachment features such as spikes or hooks. The disclosed fire-retardant material can be applied to mitigate an active, uncontrolled fire, or to vegetation on either side of a central region to contain an intentional fire within the central region, and thereby create a firebreak.

20 Claims, 8 Drawing Sheets

(56) References Cited

U.S. PATENT DOCUMENTS

| | | | | |
|---|---|---|---|---|
| 2012/0310202 A1* | 12/2012 | Wilson | ............... | A61F 13/474 |
| | | | | 604/385.03 |
| 2015/0173979 A1* | 6/2015 | Carlucci | ............... | A61F 13/532 |
| | | | | 604/385.201 |
| 2017/0359967 A1* | 12/2017 | Tetrault | ............... | A41D 1/06 |
| 2023/0248588 A1* | 8/2023 | Lindqvist | ............ | A61F 13/8405 |
| | | | | 604/367 |

* cited by examiner

BIODEGRADABLE SAP-CONTAINING PELLETS APPLICABLE TO VEGETATION FOR FIRE PROTECTION AND SUPPRESSION

RELATED APPLICATIONS

This application claims the benefit of U.S. Provisional Application No. 63/719,901, filed Nov. 13, 2024, which is herein incorporated by reference in its entirety for all purposes.

FIELD OF THE INVENTION

The invention relates to materials and methods for fighting wilderness fires, and more particularly, to materials that can be projected onto a wilderness area to combat a fire.

BACKGROUND OF THE INVENTION

Recent trends in global climate change have resulted in consistently higher temperatures and persistent droughts in many areas, which in turn have increased the risks and the occurrences of major fires in wilderness and other sparsely populated areas. Between 1985 and 2017, the western U.S. has seen an eight-fold increase in annual area burned by severe fires, and fifteen of the largest wildfires that have ever been recorded in the United States have occurred within the past ten years.

Figure 1A:
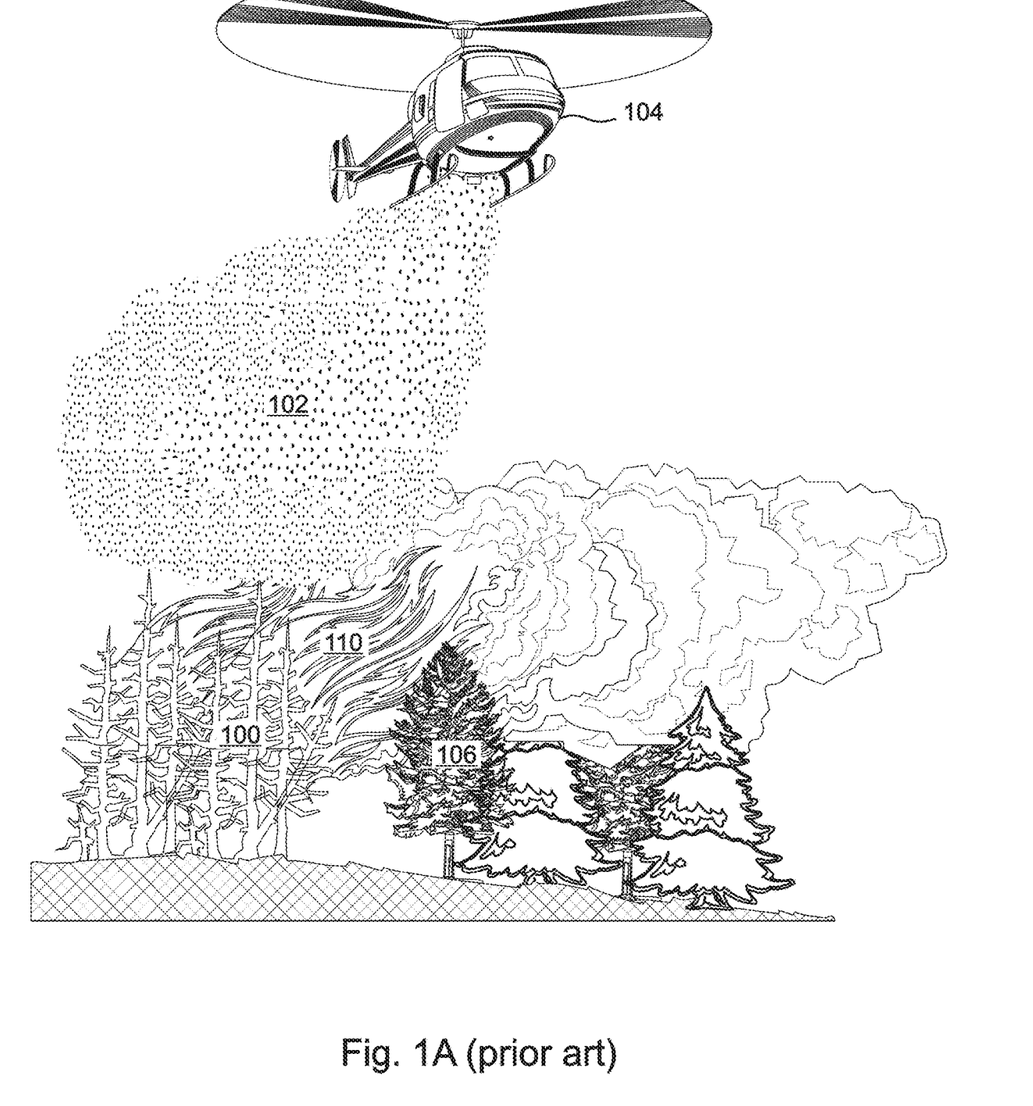
FIG. 1A illustrates application of water to an active fire according to the prior art.

In some cases, water can be applied to a fire from ground vehicles. With reference to FIG. 1A, when vegetation 100 is burning in a wilderness area that cannot easily be reached by land vehicles, water 102 can be dropped by an aircraft 104 onto the vegetation 100 to slow the advance of the fire 110. When the water 102 is applied directly to the burning vegetation 100, much of the water 102 evaporates before it can reach the burning vegetation 100 and aid in extinguishing the fire 100. The benefits of applying water 102 are even further reduced if the water 102 is applied to vegetation 106 that is not yet involved in the fire 110, because much of the applied water will drip off the vegetation onto the ground, and/or evaporate, before the fire 110 arrives.

Figure 1B:
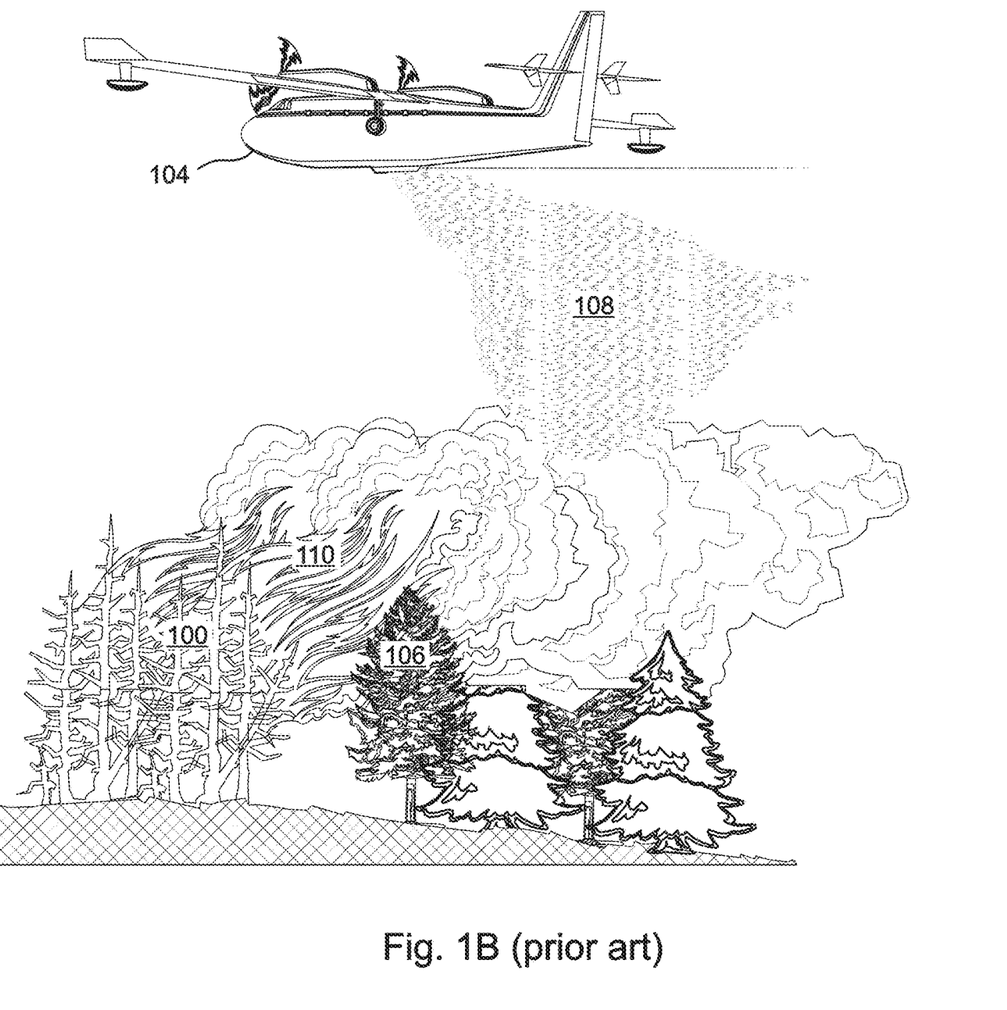
FIG. 1B illustrates application of water according to the prior art to vegetation that is threatened by an approaching fire.

Instead, with reference to FIG. 1B, a fire-retardant "chemical" 108 is often applied to vegetation 106 that is either burning or in the path of a fire 110. Typically, the "chemical" 108 is a mixture of water and ammonium phosphate, together with thickening and coloring agents. It rains down onto the vegetation 106 in a sticky film, and adheres to trees, plants, and surface soils until the fire 110 reaches the vegetation, or until it is removed by wind or rain.

However, such fire-retardant chemicals 108 are generally harmful to the environment. For example, a 2011 environmental impact study by the U.S. Forest Service concluded that ammonium phosphate based fire-retardant chemicals can adversely affect water quality, especially in small ponds and vernal pools where a lack of flowing water would hinder retardant dilution and lead to excessive nutrient production that causes algal blooms and starves the water of oxygen. The study concluded that adverse impacts could linger in these systems for two years or more.

What is needed, therefore, is a fire-retardant material and method that can be used to suppress an active fire in a forest or other wilderness area and prepare vegetation to resist an approaching fire without damaging the environment.

SUMMARY OF THE INVENTION

The present invention is a fire-retardant material and method that can be used to suppress an active fire in a forest or other wilderness area and prepare vegetation to resist an approaching fire without damaging the environment.

A first general aspect of the disclosed fire-retardant material comprises a plurality of "pellets" that can be dropped in large numbers onto vegetation that is burning or threatened by an approaching fire. Each pellet comprises a core containing a super-absorbent polymer (SAP), which is surrounded and contained by a layer of a fibrous material, such as coir. In embodiments, the fibrous layer is pressed or woven to form a shape that surrounds and contains the SAP core. In various embodiments, the SAP and/or the fibrous layer are biodegradable.

A layer of fire-resistant "attachment" material is fixed to an outer surface of the fibrous layer. In various embodiments, the attachment layer comprises an ecologically friendly, naturally occurring material, such as one or more of bark, tree sap, sand, evergreen needles, cleavers, goosegrass, tick treefoil, stickseeds, *Aparine*, and/or burdock, among others.

The attachment layer is characterized by a natural tendency to adhere mechanically and/or adhesively to other objects with which it comes in contact. For example, the attachment layer can comprise hook-like structures and/or minute quantities of a sap-like adhesive. Due to its adhering properties, the attachment layer is fixed to the biodegradable fiber, and thereby anchored to the SAP core. Upon contact with vegetation, the attachment layers anchor the particles to the leaves, branches, stems, etc. upon which the particles fall, and ensures that the SAP cores remain proximate the vegetation.

According to a second general aspect of the present invention, the fibrous material is provided in small pieces or loosely associated bundles of fiber, and water is added to the fiber to create a fiber slurry. Finally, SAP is added, which is hydrated by the water and incorporates naturally into the fiber. Upon impacting the vegetation, the wet fiber tends to stick to the vegetation, while the hydrated SAP remains entangled with the fiber and is thereby maintained proximate the vegetation. In embodiments, the SAP is provided as a powder.

A method embodiment of the first general aspect of the present invention comprises dropping the disclosed particles in large numbers onto burning or fire-threatened vegetation, for example from a nearby ground vehicle or an aircraft. In embodiments, SAP encapsulated in a fiber layer is sprayed toward the vegetation from the vehicle or aircraft, while the attachment material is simultaneously sprayed from a separate nozzle in an overlapping pattern. so that the attachment material is caused to adhere to the fiber layer subsequently to being sprayed. This approach helps to minimize any tendency for the pellets to adhere to each other, so that they are distributed more evenly onto the vegetation.

Subsequently or simultaneously, water is applied to the same area of the vegetation, thereby hydrating the SAP cores of the particles. Upon impact with the vegetation, the attachment layer maintains the pellets in close contact with the vegetation, while the SAP reduces premature evaporation of the water. As the water evaporates from the SAP cores due to intense heat, the particles can be rehydrated by dropping additional water onto the vegetation.

The SAP cores of the particles undergo significant volumetric expansion as they absorb the applied water, and are converted into gel-like materials. In embodiments, due to the relatively open weave or mat structure of the fibrous layer and the open structure of the attachment layer, the gel-like hydrated SAP suffuses through the fibrous layer and attachment layer as it expands, so that it surrounds some or all of the fibrous and attachment layers while remaining in contact therewith, as well as proximate to, or in contact with, the surrounding vegetation.

Similarly, a metho embodiment of the second general aspect of the present invention comprises mixing the fibrous material with water to form a slurry, and then spraying the slurry onto the vegetation, while simultaneously applying SAP in an overlapping pattern, for example by spraying it through a separate nozzle, so that the SAP is hydrated and incorporated with the fibrous material by the time the slurry reaches the vegetation.

In embodiments, sand is included in the slurry, thereby further enhancing the attachment of the fibrous material to the vegetation. In similar embodiments, an attachment material such as tree sap, evergreen needles, etc. is also included in the slurry, or is sprayed into the overlapping spray pattern, so that the attachment material contacts and adheres to the fibrous material within the overlapping spray pattern, and then attaches the fibrous material and the hydrated SAP to the vegetation.

Upon impact with the vegetation, the fibrous material maintains the hydrated SAP in close contact with the vegetation, while the SAP reduces premature evaporation of the water. As the water evaporates due to intense heat, the SAP can be rehydrated by applying additional water to the vegetation.

As a result of applying the disclosed pellets or slurry, in comparison with merely dropping water onto untreated vegetation, a much larger fraction of the applied water is maintained in intimate proximity with the endangered vegetation, and the progress of the fire is retarded with enhanced efficiency.

A first general aspect of the present invention is a fire-retardant material configured to suppress a fire and/or protect vegetation against an impending fire. The fire-retardant material comprising a plurality of particles, each of the particles comprising a central core containing a superabsorbent polymer (SAP), a water permeable fibrous layer surrounding and containing the central core, and a water permeable attachment layer surrounding and attached to the fibrous layer, the attachment layer comprising at least one of a mechanical attachment feature and an adhesive attachment feature.

In embodiments, the SAP is a biodegradable SAP.

In any of the above embodiments, the fibrous layer can be a biodegradable layer.

In any of the above embodiments, the fibrous layer can include coir.

In any of the above embodiments, the fibrous layer can include woven fibers.

In any of the above embodiments, the fibrous layer can include matted fibers.

In any of the above embodiments, the attachment layer can include at least one of hooks, spikes, and sap.

In any of the above embodiments, the attachment layer can include a naturally occurring plant fire-retardant material. In some of these embodiments, the attachment layer comprises at least one of sand, bark, evergreen needles, cleavers, goosegrass, tick treefoil, stickseeds, *Aparine*, and burdock.

In any of the above embodiments, each of the particles can be configured such that upon hydration, the SAP swells and becomes gel-like, the hydrated SAP thereby extending through the fibrous layer and the attachment layer and at least partially encapsulating the fibrous and attachment layers.

A second general aspect of the present invention is a method of protecting vegetation against an impending fire. The method includes applying the fire-retardant material of any embodiment of the first general aspect to the vegetation, at least some of the particles being thereby attached by their attachment layers directly to the vegetation; and applying water to the vegetation, thereby hydrating the SAP of the particles.

In embodiments, applying the fire-retardant material comprises dropping the fire-retardant material from an aircraft.

In any of the above embodiments, applying the fire-retardant material can include applying the fire-retardant material from a ground vehicle.

In any of the above embodiments, applying the water can include dropping the water from an aircraft.

In any of the above embodiments, applying the water to the vegetation can include applying the water from an aircraft In any of the above embodiments, applying the water to the vegetation can include applying the water to the vegetation concurrently with applying the fire-retardant material to the vegetation.

In any of the above embodiments, applying the water to the vegetation can include applying the water to the vegetation subsequent to applying the fire-retardant material to the vegetation.

Any of the above embodiments can further include repeating the step of applying the water to the vegetation when the SAP becomes dehydrated.

In any of the above embodiments, the impending fire can be an active and uncontrolled fire And in any of the above embodiments, the method can include applying the fire-retardant material and the water to boundary regions of the vegetation on either side of a central region, and then intentionally setting fire to the vegetation within the central region, thereby confining the fire to the central region until the vegetation therein has been consumed, and the central region has been transformed into a firebreak.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a fire-retardant material and method that can be used to suppress an active fire in a forest or other wilderness area and prepare vegetation to resist an approaching fire without damaging the environment.

Figure 2:
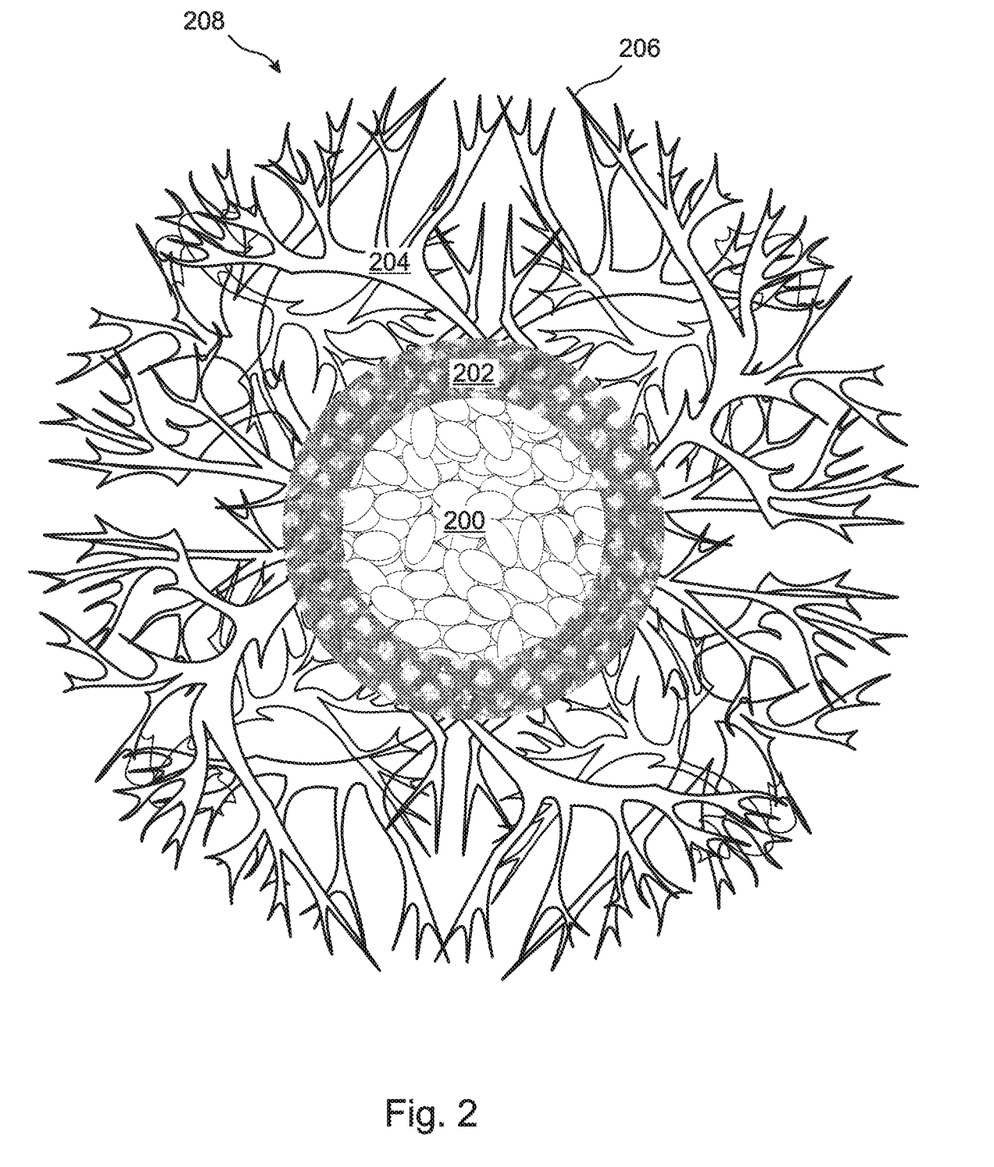
FIG. 2 is a cross-sectional view of a fire-retardant particle according to an embodiment of the first general aspect of the present invention.

In a first general aspect of the invention, the disclosed fire-retardant material comprises "pellets" that can be dropped in large numbers onto vegetation that is burning or is threatened by an approaching fire 110. With reference to FIG. 2, each pellet 208 comprises a core 200 containing a super-absorbent polymer (SAP), which is surrounded and contained by a fibrous layer 202, such as a layer of coir. In the illustrated embodiment, the fibrous layer 202 is woven to form a shape that surrounds and contains the SAP core 200. In various embodiments, the SAP 200 and/or the fibrous layer 202 are biodegradable.

A layer of fire-resistant "attachment" material 204 is fixed to an outer surface of the fibrous layer 202. In various embodiments, the attachment layer 204 is an ecologically friendly layer, for example comprising naturally occurring sand and/or plant material such as one or more of bark, tree sap, evergreen needles, cleavers, goosegrass, tick treefoil, stickseeds, *Aparine*, and/or burdock, among others.

The attachment layer 204 is characterized by a natural tendency to adhere mechanically and/or adhesively to other objects with which it comes in contact. For example, the attachment layer can comprise seed pods having minute quantities of a sap-like adhesive, spines 206, and/or hook-like structures which enable the seed pods to become attached to passing animals and to thereby spread outward from the original plant. Due to its adhering properties, the attachment layer 204 is fixed to the biodegradable fiber layer 202, and thereby anchored to the SAP core 200.

Figure 3:
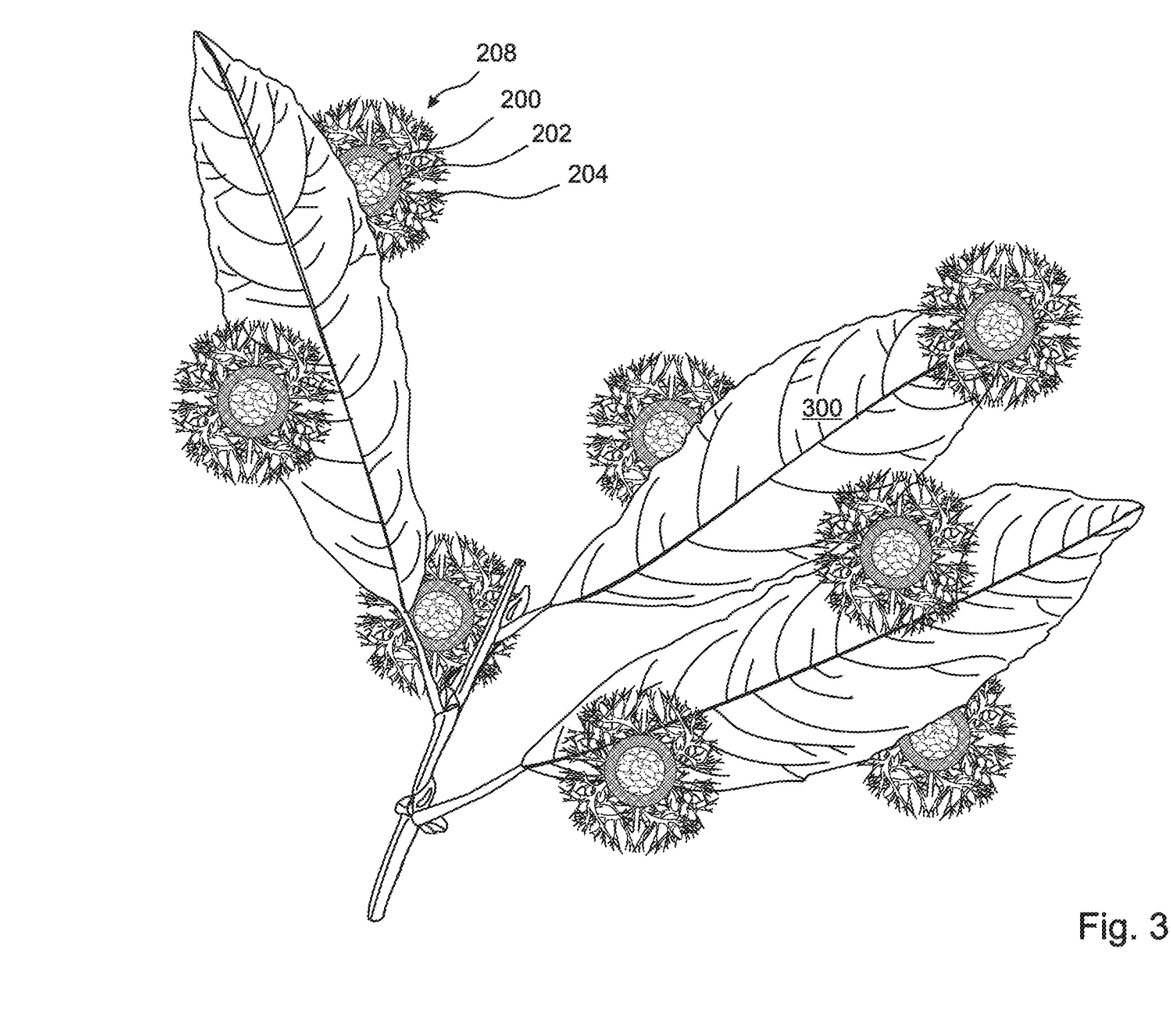
FIG. 3 illustrates direct attachment of the particles of FIG. 2 to vegetation that is threatened by an approaching fire, according to an embodiment of the present invention.

With reference to FIG. 3, upon being applied to burning or fire-threatened vegetation 300, the attachment layer 204 anchors the particles 208 to the leaves, branches, stems, etc. 300 upon which the particles 208 fall, and ensures that the SAP cores 200 remain proximate the vegetation 300.

Figure 4:
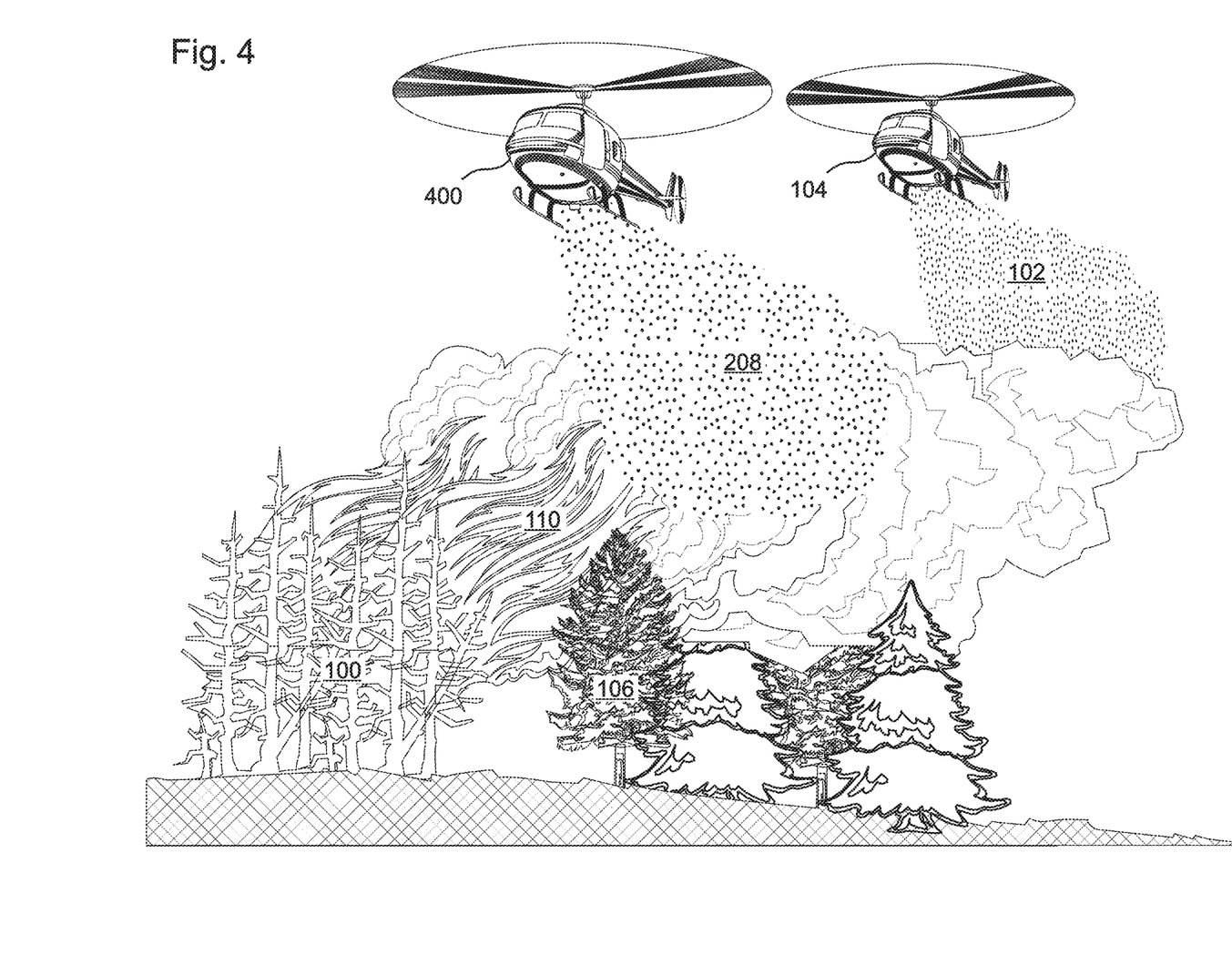
FIG. 4 illustrates aerial application of the disclosed particles to fire-threatened vegetation, followed by aerial application thereto of water, according to a method embodiment of the first general aspect of the present invention.

With reference to FIG. 4, a method embodiment of the first general aspect of the present invention comprises dropping the disclosed particles 208 in large numbers onto threatened vegetation 106, for example from a nearby ground vehicle, or by an aircraft 400. Subsequently or simultaneously, water 102 is dropped onto the same area of the vegetation 106, thereby hydrating the SAP cores 200 of the particles 208. If necessary, as the fire causes the SAP 200 to dehydrate, the SAP 200 can be rehydrated by dropping additional water 102 onto the vegetation 106.

In embodiments, SAP 200 encapsulated in a fibrous layer 202 is sprayed from the vehicle or aircraft 400, while the attachment material 204 is simultaneously sprayed from a separate nozzle in an overlapping pattern. so that the attachment material 204 is caused to adhere to the fibrous layer 202 subsequently to being sprayed. This approach helps to minimize any tendency for the pellets 208 to adhere to each other, and distributes the pellets 208 more evenly onto the vegetation.

Figure 5:
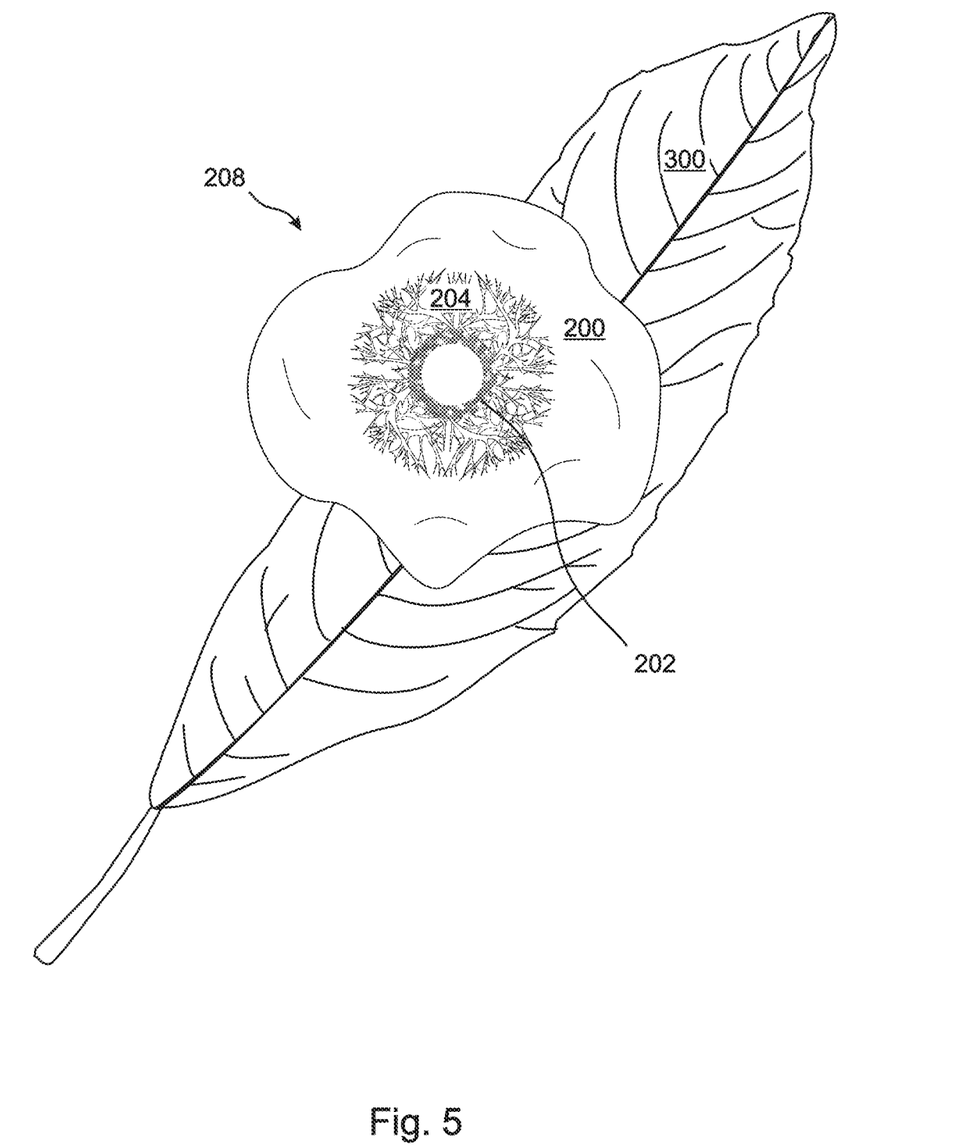
FIG. 5 illustrates a particle attached to vegetation after hydration of the SAP according to an embodiment of the first general aspect of the present invention.

With reference to FIG. 5, the SAP cores 200 of the particles 208 undergo significant volumetric expansion as they absorb the applied water, and are converted into gel-like materials. In embodiments, due to the relatively open weave or mat structure of the fibrous layer 202, the gel-like hydrated SAP 200 suffuses through the fibrous layer 202 and attachment layer 204 as it expands, while remaining in contact with the fibrous 202 and attachment 204 layers, and proximate to, or in contact with, the vegetation 300 to which the particle 208 is attached.

Figure 6:
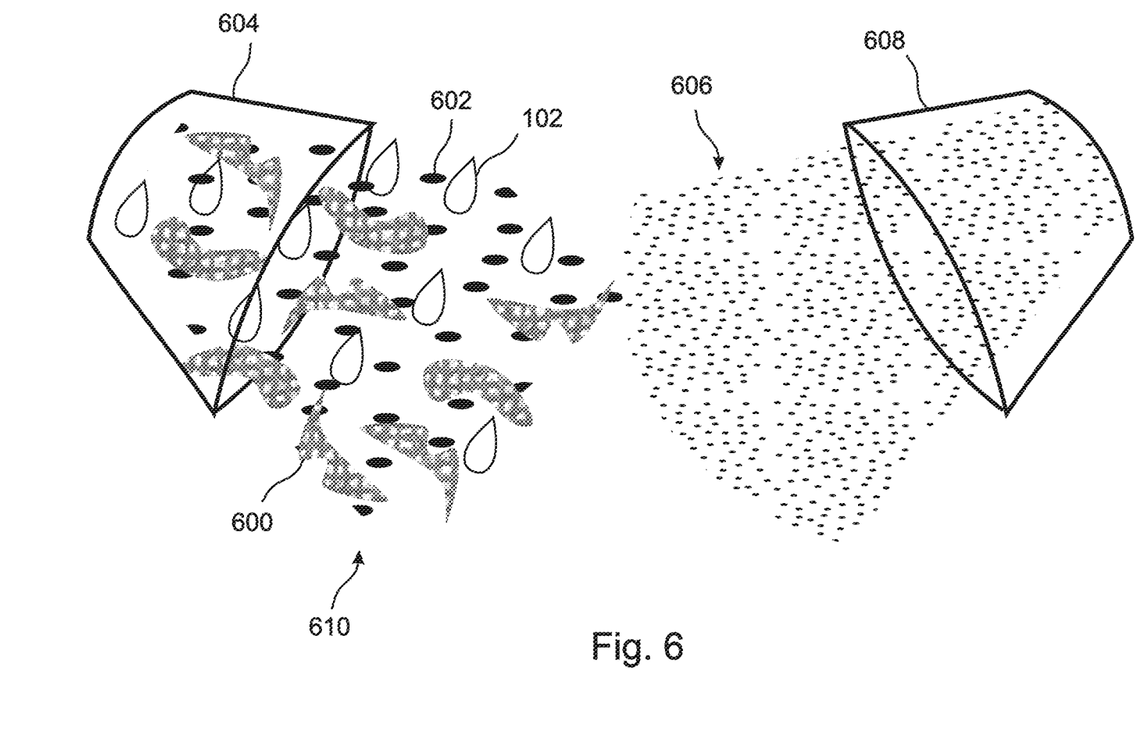
FIG. 6 illustrates simultaneous spraying of a fiber slurry and SAP power from separate nozzles in an overlapping pattern according to an embodiment of the second general aspect of the present invention.

According to a second general aspect of the present invention, with reference to FIG. 6, the fibrous material 600 is provided in small pieces or loosely associated bundles of fiber, and water 102 is added to the fiber 600 to create a fiber slurry 610. SAP 606 is added to the slurry 610, which is hydrated by the water 102 and incorporates naturally into the fiber 600.

In some embodiments, the SAP 606 is added to the slurry 610 before the slurry is sprayed onto the vegetation. In other embodiments, as illustrated in FIG. 6, the fiber slurry 610 without SAP 606 is sprayed from a first nozzle 604 onto the vegetation 300, while simultaneously applying the SAP 606 in an overlapping pattern, for example by spraying it through a second nozzle 608, so that the SAP 606 is hydrated and incorporated with the fibrous material 600 within the overlapping spray pattern before it reaches the vegetation 300. In various embodiments, the SAP is provided as a powder.

In embodiments, sand 602 is included in the slurry 610, thereby further enhancing the attachment of the fibrous material 600 to the vegetation 300. In similar embodiments, an attachment material such as tree sap, evergreen needles, etc. is included in the slurry, or is sprayed separately into the overlapping pattern, so that after the components have been sprayed, the attachment material contacts and adheres to the fibrous material 600, and then attaches the fibrous material 600 with its incorporated, hydrated SAP 200 to the vegetation 300.

Figure 7:
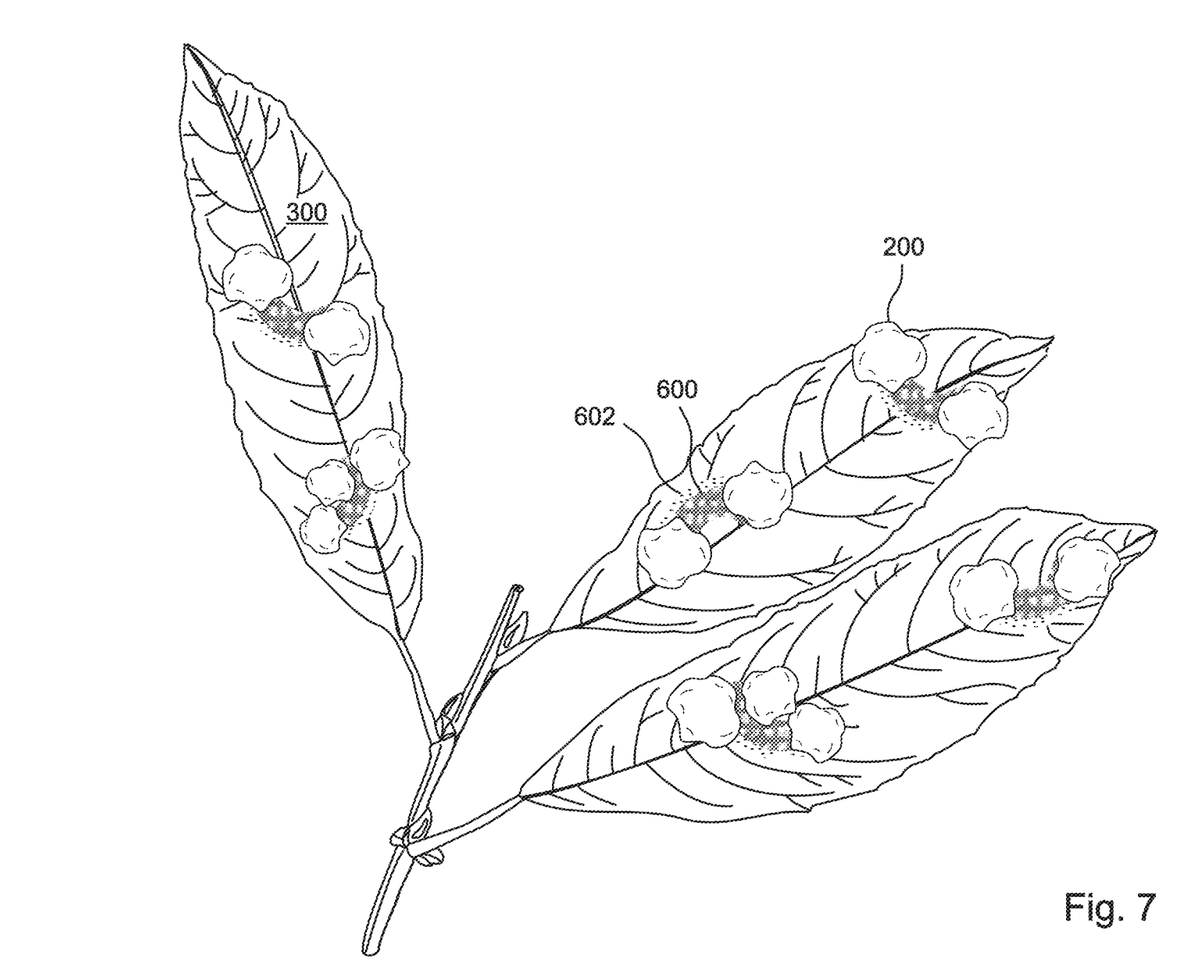
FIG. 7 illustrates attachment to vegetation of the fibrous material and incorporated hydrated slurry according to an embodiment of the second general aspect of the invention.

With reference to FIG. 7, upon impacting the vegetation 300, the wet fiber 600 tends to stick to the vegetation 300, while the hydrated SAP 200 remains entangled with the fiber 600, and is thereby maintained proximate the vegetation 300.

As a result of pre-applying the disclosed pellets 208 or slurry 610 to the vegetation 106, 300, in comparison with merely dropping the water 102 onto untreated vegetation 106, 300, a much larger fraction of the applied water 102 is maintained in intimate proximity with the endangered vegetation 106, 300, and the progress of the fire 110 is retarded with enhanced efficiency.

In addition to fighting uncontrolled fires 110, embodiments of the present invention are applicable to containing and directing intentional, controlled fires. For example, if a firebreak is to be created in a wilderness area, the vegetation on either side of the planned firebreak can be treated with the disclosed particles 208 and water 102, or SAP slurry 610, after which the vegetation within the planned firebreak can be intentionally burned to form a barrier region substantially devoid of fuel that might otherwise feed a future fire 110.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

The invention claimed is:

1. A fire-retardant mixture configured to suppress a fire and/or protect vegetation against an impending fire, the fire-retardant mixture comprising,
a plurality of pellets, each of the pellets comprising:
a central core containing a plurality of superabsorbent polymer (SAP) particles;
a water permeable fibrous shell layer surrounding and containing the central core; and
a water permeable attachment layer surrounding and attached to an outer surface of the fibrous layer, the attachment layer comprising at least one of a mechanical attachment feature and an adhesive attachment feature;
the pellets being separated and detached from one another in the fire-retardant mixture;
each of the pellets being substantially globular in shape;
the pellets, when scattered onto vegetation from an aircraft, spread apart from one another, and separately and independently impact the vegetation and adhere thereto.

2. The fire-retardant mixture of claim 1, wherein the SAP is a biodegradable SAP.

3. The fire-retardant mixture of claim 1, wherein the fibrous layer is a biodegradable layer.

4. The fire-retardant mixture of claim 1, wherein the fibrous layer comprises coir.

5. The fire-retardant mixture of claim 1, wherein the fibrous layer comprises woven fibers.

6. The fire-retardant mixture of claim 1, wherein the fibrous layer comprises matted fibers.

7. The fire-retardant mixture of claim 1, wherein the attachment layer comprises at least one of hooks, spikes, and sap.

8. The fire-retardant mixture of claim 1, wherein the attachment layer comprises a naturally occurring plant fire-retardant material.

9. The fire-retardant mixture of claim 8, wherein the attachment layer comprises at least one of sand, bark, evergreen needles, cleavers, goosegrass, tick treefoil, stickseeds, *Aparine*, and burdock.

10. The fire-retardant mixture of claim 1, wherein each of the pellets is configured such that upon hydration, the SAP particles swell and becomes gel-like, the hydrated SAP particles thereby extending through the fibrous layer and the attachment layer and at least partially encapsulating the fibrous and attachment layers.

11. A method of protecting vegetation against an impending fire, the method comprising:
applying the fire-retardant mixture of claim 1 to the vegetation, at least some of the pellets being thereby adhered by their attachment layers directly to the vegetation; and
applying water to the vegetation, thereby hydrating the SAP particles of the pellets.

12. The method of claim 11, wherein applying the fire-retardant mixture comprises dropping the fire-retardant mixture from an aircraft.

13. The method of claim 11, wherein applying the fire-retardant mixture comprises applying the fire-retardant mixture from a ground vehicle.

14. The method of claim 11, wherein applying the water comprises dropping the water from an aircraft.

15. The method of claim 11, wherein applying the water to the vegetation comprises applying the water from a ground vehicle.

16. The method of claim 11, wherein applying the water to the vegetation comprises applying the water to the vegetation concurrently with applying the fire-retardant mixture to the vegetation.

17. The method of claim 11, wherein applying the water to the vegetation comprises applying the water to the vegetation subsequent to applying the fire-retardant mixture to the vegetation.

18. The method of claim 11, further comprising repeating the step of applying the water to the vegetation when the SAP becomes dehydrated.

19. The method of claim 11, wherein the impending fire is an active and uncontrolled fire.

20. The method of claim 11, wherein the method comprises applying the fire-retardant mixture and the water to boundary regions of the vegetation on either side of a central region, and then intentionally setting fire to the vegetation within the central region, thereby confining the fire to the central region until the vegetation therein has been consumed, and the central region has been transformed into a firebreak.

* * * * *